United States Patent
Lee et al.

(10) Patent No.: US 7,680,284 B2
(45) Date of Patent: Mar. 16, 2010

(54) APPARATUS AND METHOD FOR CONTROLLING OPERATION OF AUDIO LOW SOUND OUTPUT MEANS

(75) Inventors: Kyu Ho Lee, Kwacheon-si (KR); Jun Hyung Park, Anyang-si (KR); Yang Ki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1246 days.

(21) Appl. No.: 11/019,472

(22) Filed: Dec. 23, 2004

(65) Prior Publication Data

US 2005/0192687 A1 Sep. 1, 2005

(30) Foreign Application Priority Data

Feb. 27, 2004 (KR) ................. 10-2004-0013273
Mar. 23, 2004 (KR) ................. 10-2004-0019715

(51) Int. Cl.
*H04R 29/00* (2006.01)
(52) U.S. Cl. ............... 381/59; 381/58; 381/77; 381/79; 700/94; 710/303; 710/304; 710/74
(58) Field of Classification Search ............ 381/58–59, 381/80–81, 85, 98–100, 77, 86, 55, 79; 700/94; 710/303–304, 14, 18, 36, 38, 74
See application file for complete search history.

(56) References Cited

U.S. PATENT DOCUMENTS

| | | | | |
|---|---|---|---|---|
| 5,161,198 A | * | 11/1992 | Noble ..................... | 381/81 |
| 5,257,413 A | * | 10/1993 | Warner et al. ........... | 455/557 |
| 5,910,991 A | * | 6/1999 | Farrar ..................... | 381/59 |
| 6,148,353 A | * | 11/2000 | Cho ........................ | 710/303 |
| 6,321,278 B1 | * | 11/2001 | Phu et al. ................ | 710/14 |
| 6,618,636 B1 | * | 9/2003 | Sakai et al. ............. | 700/94 |
| 6,859,538 B1 | * | 2/2005 | Voltz ....................... | 381/77 |
| 7,088,834 B2 | * | 8/2006 | Takemoto et al. ....... | 381/104 |
| 2001/0020193 A1 | * | 9/2001 | Teramachi et al. ...... | 700/94 |
| 2003/0185400 A1 | * | 10/2003 | Yoshizawa et al. ...... | 381/58 |
| 2003/0187529 A1 | * | 10/2003 | Lee ......................... | 700/94 |

FOREIGN PATENT DOCUMENTS

| | | |
|---|---|---|
| CN | 2312472 Y | 3/1999 |
| JP | 63-269633 | 11/1988 |
| JP | 2002-078072 | 3/2002 |

* cited by examiner

*Primary Examiner*—Xu Mei
*Assistant Examiner*—Disler Paul
(74) *Attorney, Agent, or Firm*—KED & Associates LLP

(57) ABSTRACT

The present invention is related to an apparatus and a method for controlling operations of low sound output in an audio system. Embodiments of an apparatus and a method for controlling an operation of an audio woofer in a machine provided with an audio system such as a portable computer can operate using at least one or more information of an audio data type, an audio signal, an audio channel number and a power source. Therefore, it is possible to accurately select and listen to an audio of a high-pass component only by stopping operations of a low-pass component for an audio as reproduced. In addition, embodiments of the present invention can extend a time for using a battery by controlling operations of a woofer, when using the battery power.

22 Claims, 11 Drawing Sheets

Fig.3A

Woofer Enable/Disable File Type List

| File Type | | Woofer_Enable/Disable |
|---|---|---|
| MP3 | 0001 | 0 |
| WAV | 0010 | 0 |
| WM | 0011 | 0 |
| JPG | 0100 | 1 |
| BMP | 0101 | 1 |
| PDF | 0110 | 1 |
| TXT | 0111 | 1 |
| ⋮ | ⋮ | ⋮ |

Fig.3B

Woofer Enable/Disable Reference Frequency

| Reference frequency | Woofer_Enable/Disable |
|---|---|
| 1 MHz | 0 |
| 2 MHz | 0 |
| 3 MHz | 1 |
| 4 MHz | 1 |
| ⋮ | ⋮ |

Woofer Enable/Disable Channel Type

| Channel type | Woofer_Enable/Disable |
|---|---|
| Mono | 1 |
| Stereo | 1 |
| 3Channel | 1 |
| 4Channel | 1 |
| 5.1Channel | 0 |
| 6.1Channel | 0 |
| ⋮ | ⋮ |

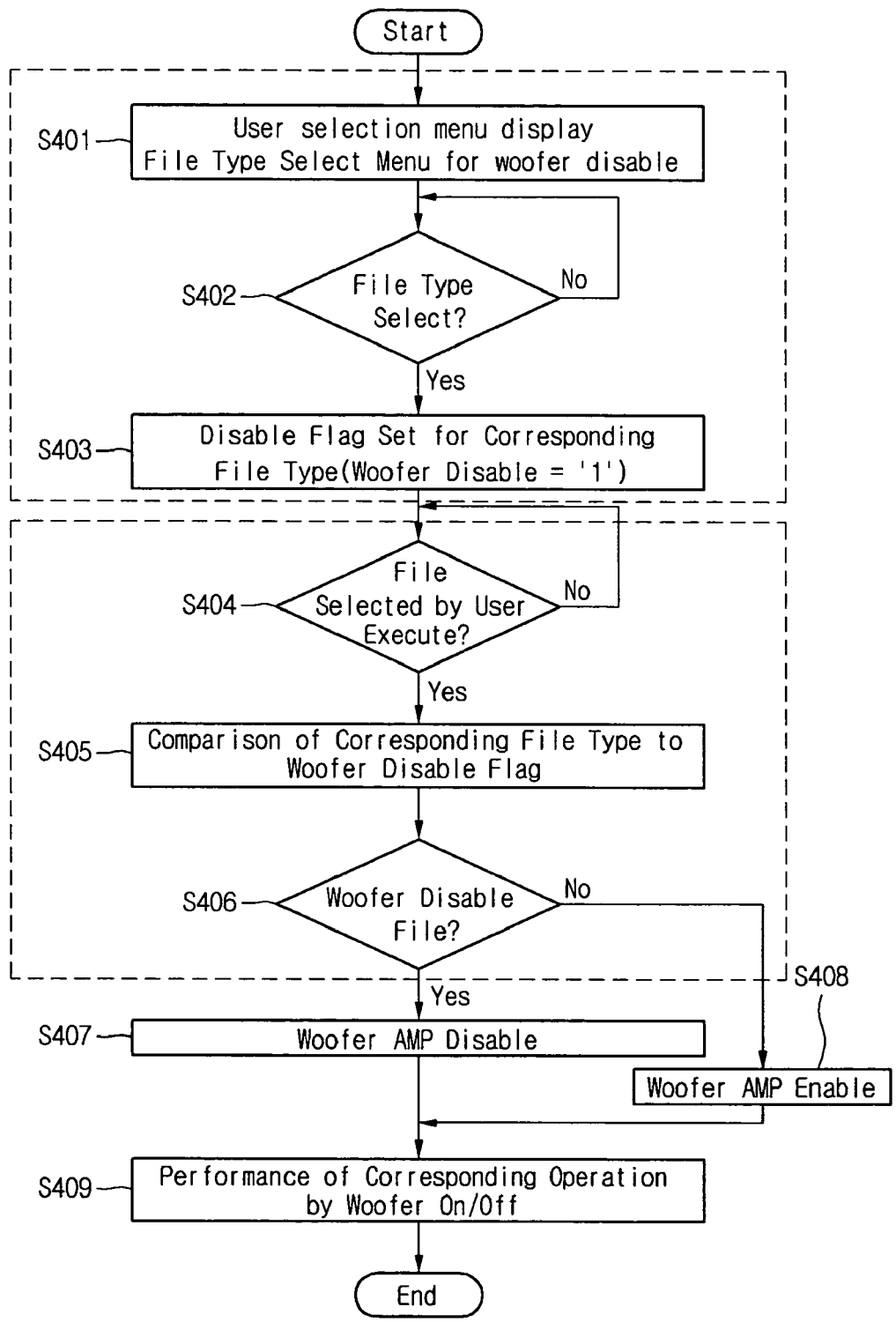

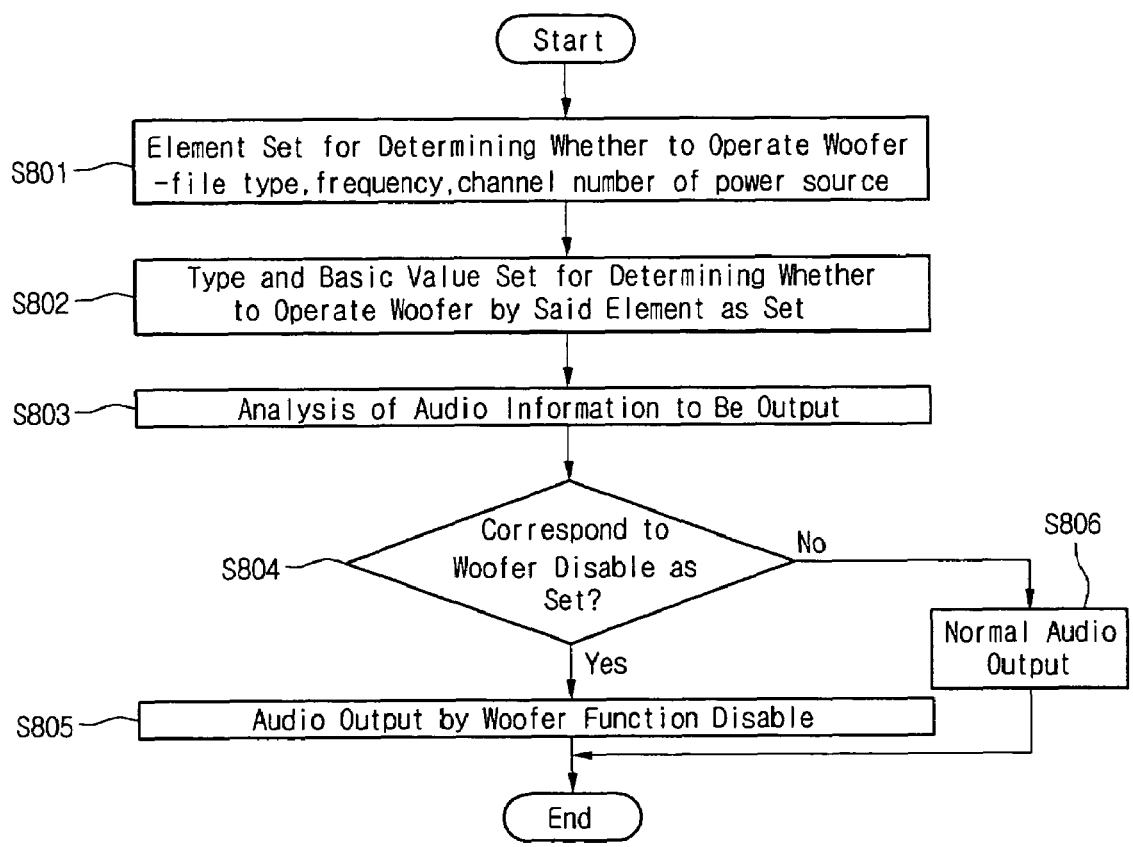

APPARATUS AND METHOD FOR CONTROLLING OPERATION OF AUDIO LOW SOUND OUTPUT MEANS

BACKGROUND OF THE INVENTION

1. Field of the Invention

The present invention relates to an apparatus and a method for controlling an operation of audio output in an audio system including output operations for outputting different sound ranges.

2. Background of the Related Art

A notebook computer as a personal appliance is widely used. In the notebook computer, various kinds of multimedia files can be recorded, written-in, stored, or read-out and reproduced in mass recording media such as a hard disk.

Recently, the notebook computer is additionally provided with a woofer function for outputting a low sound. The woofer function separates audio signals with low-pass components and audio signals with high-pass components from the reproduced audio signal components. The woofer function amplifies the audio with the low-pass component and outputs it as a vibration sound and amplifies the audio with the high-pass component and outputs it as a tone sound. Accordingly, a user of the notebook computer having the woofer function can listen to the tone sound of the high-pass component and simultaneously feel the audio of the low-pass component as a dynamic vibration sound through a speaker for the woofer while reproducing a music file such as a MP3 audio or a moving picture file such as a movie.

However, as described above, the related art notebook computer has various disadvantages. For example, when the user selectively listens to the audio of the high-pass components, without any vibration sound of unnecessary low-pass components, for example when reproducing a specific type of a file such as a file for language study, there are the problems that the user has to change and set an audio output mode one by one or individually. In addition, a battery life can be reduced by an unnecessary woofer operation.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method for controlling operations of audio output devices according to prescribed system characteristics.

Another object of the present invention is to solve at least the foregoing problems and/or disadvantages by providing an apparatus and a method for controlling an operation of audio device that can forcibly stop a woofer operation for an audio of a low-pass component according to the conditions set by a user.

Another object of the present invention is to provide an apparatus and a method for controlling operations of audio low sound output devices by controlling a woofer operation based on an identified type of a file to be executed.

Another object of the present invention is to provide an apparatus and a method for controlling an operation of audio low sound output device based on an identified channel number of the present file as executed.

Another object of the present invention is to provide an apparatus and a method for controlling an operation of audio low sound output device by identifying frequency of the present file as executed.

Another object of the present invention is to provide an apparatus and method for controlling operations of an audio low sound output device according to a current power source.

In order to achieve at least the above objects and advantages in a whole or in part, in accordance with one aspect of the present invention there is provided an apparatus for controlling an operation of a woofer device in a portable computer that includes operation means for executing a system operation and data, a CODEC configured to perform encoding or decoding of audio data, a woofer device configured to output a low audio sound, a control circuit coupled to the CODEC and the woofer device configured to selectively enable/disable operation of the woofer device according to at least one member chosen from an audio data type, an audio signal frequency and an audio channel number of an audio file to be output or a current power source.

To further achieve at least the above objects in a whole or in part, in accordance with one aspect of the present invention there is provided a method for operating an audio device in a portable system that includes identifying a file type being currently executed in a system and selectively disabling a lower sound audio output device of a plurality of audio output devices in an audio device as a result of the identification. To further achieve at lease the above objects in a whole or in part, in accordance with one aspect of the present invention there is provided a method for operating an audio device in a portable system that includes setting an enable/disable status of a low sound audio output device on the basis of a prescribed channel number, identifying a channel number of a file to be currently executed, determining the enable/disable status of the identified file channel number; and disabling an operation of the low sound audio output device when the determined enable/disable status is disable, wherein the low sound audio output device is one of a plurality of audio output devices having different characteristics in an audio device.

To further achieve at least the above objects in a whole or in part, in accordance with one aspect of the present invention there is provided a method for operating an audio device in a portable system that includes setting an enable/disable status of a low sound audio output device according to a prescribed frequency, identifying a frequency of a file being currently executed, determining the enable/disable status of the identified frequency, and disabling an operation of the low sound audio output device when the determined enable/disable status is disable, wherein the low sound audio output device is one of a plurality of audio output devices having different characteristics in an audio device.

To further achieve at least the above objects in a whole or in part, in accordance with one aspect of the present invention there is provided a method for operating an audio device in a portable system that includes determining an enable/disable audio command responsive to at least one of a plurality of audio information of audio to be output, identifying the at least one of audio information of a file being currently executed, determining the enable/disable audio command corresponding to the identified file, and disabling an operation of the low sound audio output device when the determined enable/disable command is disable, wherein the low sound audio output device is one of a plurality of audio output devices having different characteristics in an audio device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3A is a diagram showing an exemplary file type list to set a woofer as Enable/Disable;

FIG. 3B a diagram showing an exemplary frequency for setting a woofer as Enable/Disable;

FIG. 4 is a flow chart illustrating an embodiment of a method for controlling an audio woofer operation by a file type according to the present invention;

FIG. 8 is a flow chart illustrating an embodiment of a method of controlling audio output device operations according to the present invention.

DETAILED DESCRIPTION OF PREFERRED EMBODIMENTS

Figure 1A:
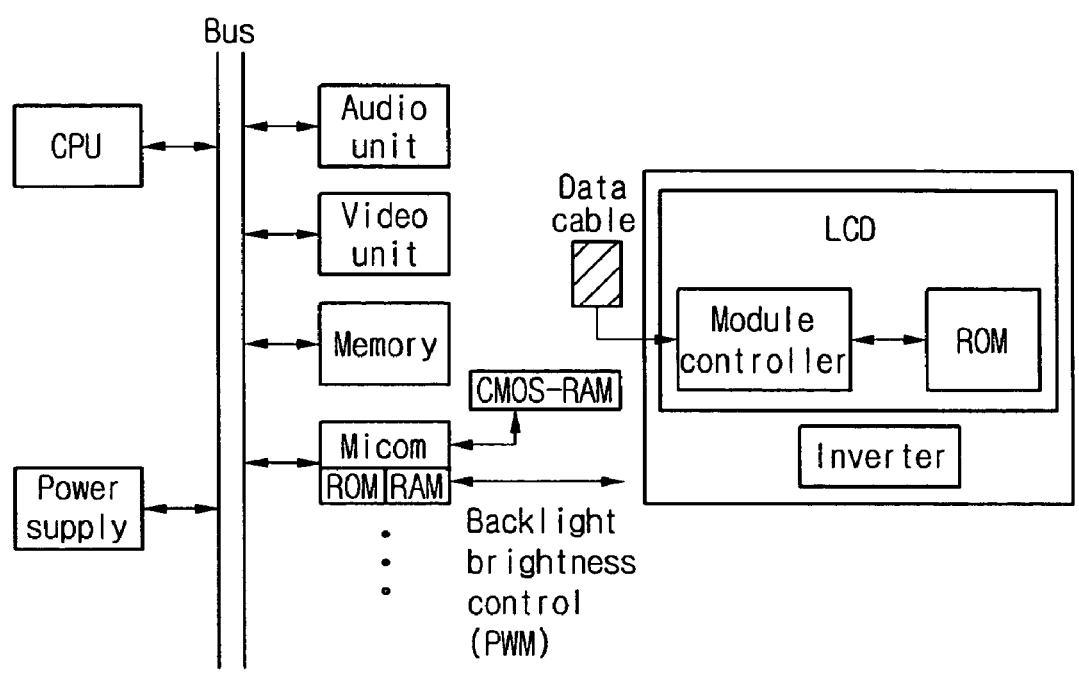
FIG. 1A is a block diagram illustrating a configuration of a general computer.

FIG. 1A is a block diagram illustrating a configuration of an exemplary computer. As shown in FIG. 1A, at least an audio unit, a video unit, a memory and a control unit (e.g., CPU) are coupled to one another by a bus.

Figure 1B:
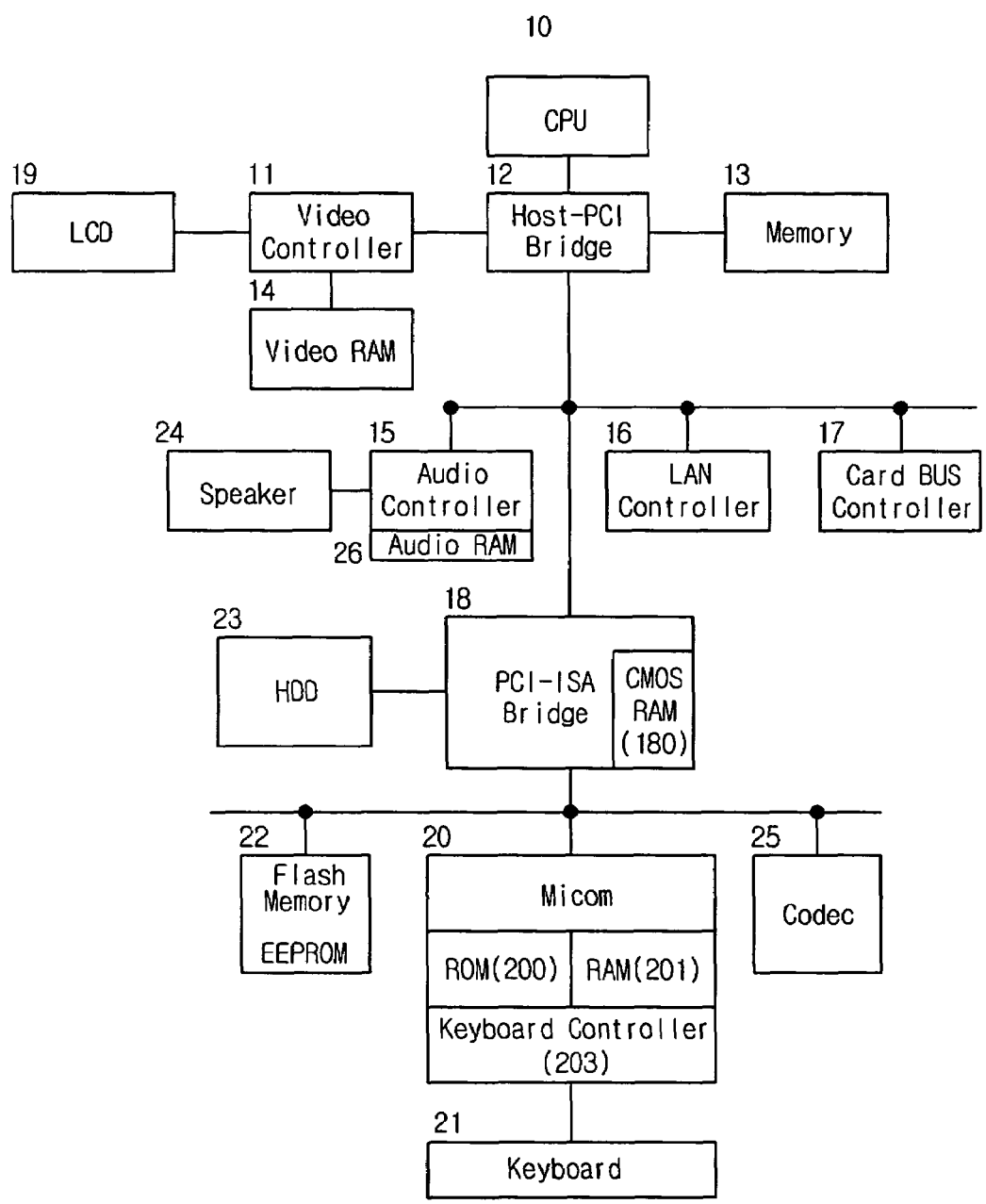
FIG. 1B is a block diagram illustrating a configuration of a computer including an audio output device, a memory and a control unit according to an embodiment the present invention.

FIG. 1B is a block diagram illustrating a whole configuration of an exemplary computer including a speaker 24 as an exemplary audio output device, a memory and a control unit according to an embodiment of the present invention. The memory such as exemplary memory 22 can store, in the form of binary data, the information regarding a type of a file as set by a user, a channel number and frequency of an audio signal in order to control (e.g., Enable/Disable) audio operations. The computer can include a CPU 10, a video controller 11, a host-PCI bridge 12, a memory 13, a video RAM 14, a LCD 19, an audio controller 15, an audio RAM 26, the speaker 24, a LAN controller 16, a card BUS controller 17, a PCI-ISA bridge 18, a HDD 23, a microcomputer 20, a codec 25, a keyboard 21 and a woofer as a low sound output device.

The PCI-ISA bridge 18 can control peripheral devices and is preferably provided with a CMOS-RAM 180. The micom 20 can be provided with a ROM 200, a RAM 201 and a keyboard controller 203.

Figure 2A:
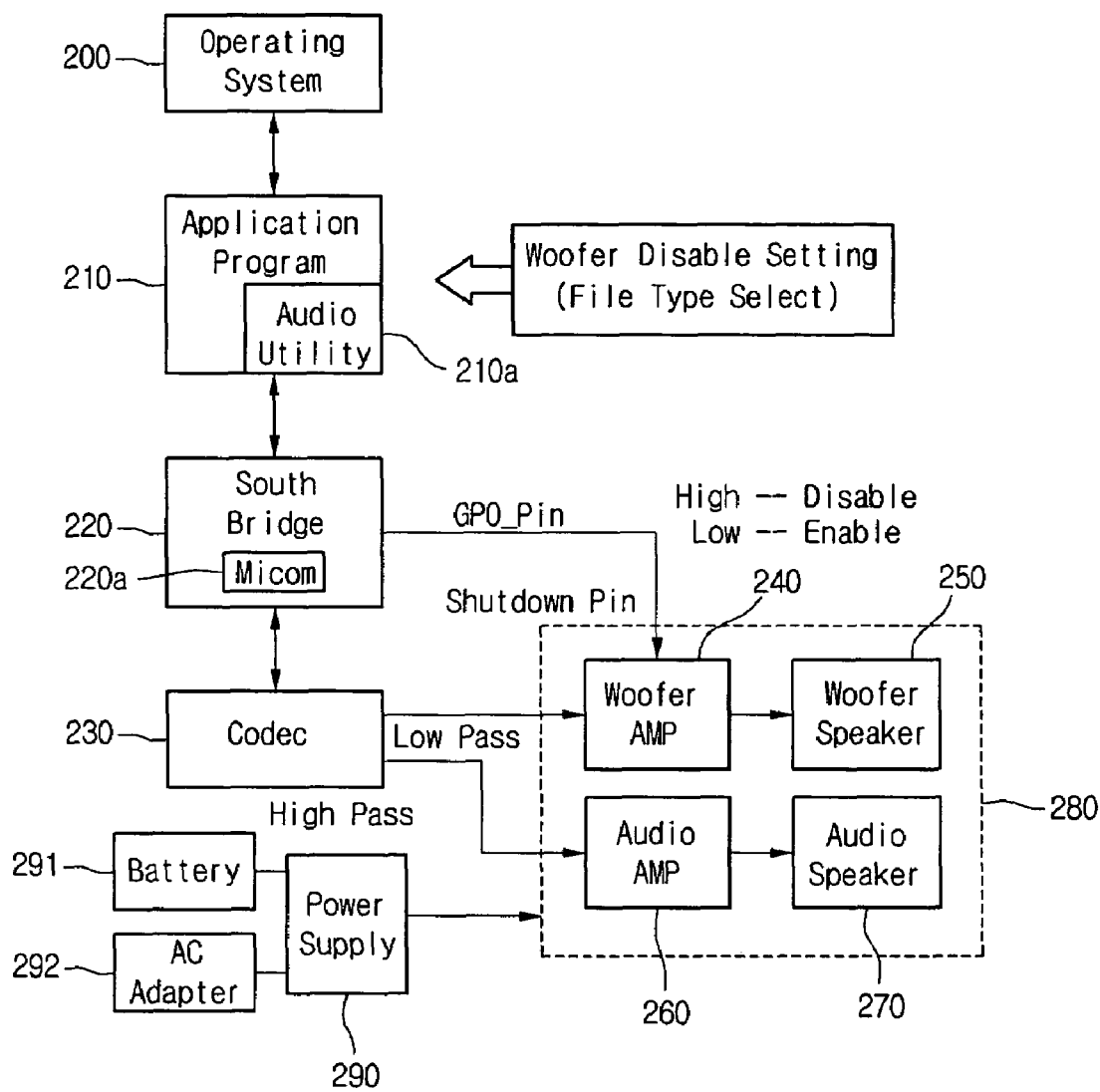
FIG. 2A is a block diagram illustrating a system to which an embodiment of an apparatus for controlling an audio woofer operation is applied by a type of a file according to the present invention.

FIG. 2A is a block diagram illustrating a system to which an embodiment of an apparatus using a type of a file for controlling audio woofer operations is applied according to the invention. As shown in FIG. 2A, the system can include an operating system OS 200, an application program 210, a south bridge 220, a CODEC 230, a power supply as a power source supplying device 290, a battery 291, an AC adapter 292 and an output device 280. The output device 280 can include a woofer AMP 240, a woofer speaker 250, an audio AMP 260, and an audio speaker 270.

In the application program 210, a file type can be selectively designated, for example through a menu screen by a user, and a woofer disable control value (for example, Enable=0, Disable=1) for forcibly disabling the woofer AMP 240 can be recorded (e.g., in a binary form). Such information can be managed as the information of a woofer disable file type list. The woofer disable file type list can be stored in a nonvolatile memory such as EEPROM as illustrated in FIG. 3A.

Therefore, when a file is executed through an interface with the OS 200, the application program 210 can identify the type of the file as executed. Further, the application program 210 can determine whether the file type as identified is the file type set as a woofer disable. Alternatively, a user or the like could set a prescribed or selected individual file to woofer disable.

If the identified file type is determined as the woofer disable file type, the woofer AMP 240 can be forcibly off through an interface with the micom 220a included in the south bridge 220. Accordingly the user can output only a tune sound corresponding to a high-pass component of an audio signal to be reproduced by the CODEC 230 to selectively listen to the tune sound through audio AMP 260 and the audio speaker 270.

Figure 2B:
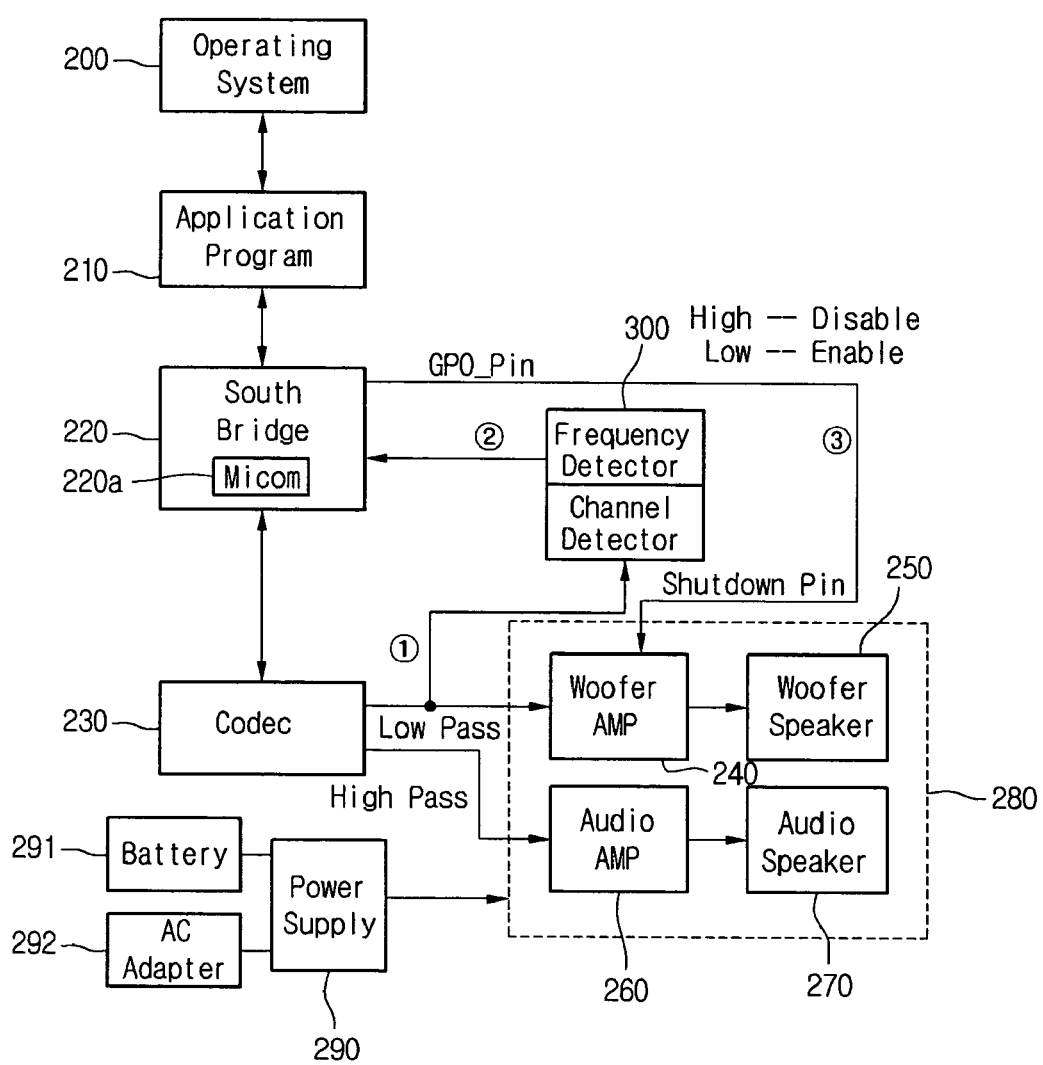
FIG. 2B is a block diagram illustrating a system to which an embodiment of an apparatus for controlling an audio woofer operation is applied by a feature of frequency according to the present invention.

FIG. 2B is a block diagram illustrating a system to which an embodiment of an apparatus for controlling audio woofer operations is applied that uses a feature of frequency according to the invention. As shown in FIG. 2B, a system has a similar configuration as corresponding elements shown in FIG. 2A. However, the embodiment shown in FIG. 2B can further include a frequency detector 300 for detecting the frequency of an audio signal to be output in the CODEC 230.

As shown in FIG. 2B, the system can include an OS 200, an application program 210, a south bridge 220, a CODEC 230 and an output device 280. The output device 280 can include a woofer AMP 240, a woofer speaker 250, an audio AMP 260, an audio speaker 270 and a frequency detector 300.

In the application program 210, a file as selectively designated by a user can be reproduced. In the CODEC 230, audio data of the file as reproduced can be decoded and signal-processed so that an audio signal of a high-pass component is output to the audio AMP 260 and an audio signal of a low-pass component is separately output to the woofer AMP 240.

In the audio AMP 260, the audio signal of the high-pass component can be amplified, then output as a tune sound through the audio speaker 270. In the woofer AMP 240, the audio signal of the low-pass component can be amplified, then output as a vibration sound through the woofer speaker 250.

In the frequency detector 300, audio frequency as input from the CODEC 230 to the woofer AMP 240, for example, can be detected. Then, the detected frequency value can be output to the micom 220*a* included in the south bridge 220*a*. In the micom 220*a*, when the audio frequency as detected by the frequency detector is in excess of predetermined basic frequency, for example, 3 MHz, which cannot be received in the woofer AMP 240, a control signal can be output to disable the woofer AMP 240.

As shown in FIG. 3B, an exemplary woofer disable frequency list can be determined. However, the present invention is not intended to be so limited. For example, the reference frequency or the woofer enable/disable status for a given frequency can be changed.

Accordingly, the woofer AMP 240 can be forcibly stopped according to a frequency of a reproduced file. Thus, a noise can be prevented from being output through the woofer speaker 250 or time for using a battery can be prevented from being inefficiently reduced due to a unnecessary operation of the woofer.

However, the present invention is not intended to be so limited. For example, in the frequency detector 300, a channel number as determined or output by the CODEC 230 can be used as a channel detector.

As described above, FIG. 3A shows a exemplary file type list of file types to be executed can set a woofer as Enable/Disable. As shown in FIG. 3A, MP3, WAV and WMA files can set an output of a south bridge as enable (e.g., "0") to operate a woofer. Further, JPG, BMP, PDF and TEXT files can set the output of the south bridge as disable (e.g., "1") not to operate a woofer. Each of the files can be stored in a memory in a binary form.

FIG. 3B shows an exemplary list of frequencies for setting a woofer as Enable/Disable. As shown in FIG. 3B, if a frequency is 1 MHz, 2 MHz, an output of a south bridge can be set as enable (e.g., "0") to operate an woofer; and if the frequency is 3 MHz, 4 MHz or more, the output of the south bridge can be set as disable (e.g., "1") not to operate the woofer.

Figures 3C, 3D:
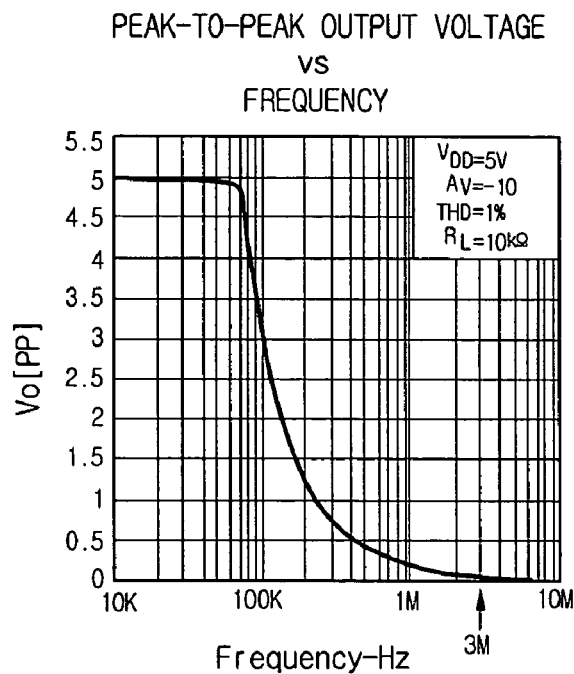
FIG. 3C is a graph illustrating an exemplary relation between audio frequency and output voltage.
FIG. 3D is a diagram showing an exemplary channel number or a channel type list to set a woofer as Enable/Disable.

FIG. 3C is a graph illustrating an exemplary relation between audio frequency and output voltage. As shown in FIG. 3C, if an output of a woofer AMP is in excess of a prescribed frequency (for example, 3 MHz) corresponding to almost "0", a control signal can be output to disable a woofer AMP.

Accordingly, using embodiments of the invention the woofer AMP can be forcibly stopped in advance to reduce or prevent a noise from being outputted through the woofer speaker. Further, a time for inefficiently using a battery power because of an unnecessary operation of a woofer can be reduced.

FIG. 3D is a diagram that shows an exemplary channel number or channel type list that can be used to set a woofer status as Enable/Disable. As shown in FIG. 3D, in case a channel number is 1 (mono), 2 (stereo), 3 and 4, an output of a south bridge can be set as disable (e.g., "1") to not operate a woofer, and in case of a 5.1 channel, a 6.1 channel, the output of the south bridge can be set as enable (e.g., "0") to operate the woofer.

FIG. 4 is a flow chart illustrating an embodiment of a method for controlling an audio woofer operation by a file type according to the present invention. As shown in FIG. 4, in an application program 210, a user selection menu to selectively disable a low pitch audio output device (e.g., woofer AMP 240) can be displayed when reproducing a specific type of a file in a notebook computer. (block S401) Alternatively, the user selection menu can be displayed during system set-up or initialization.

In the application program or the like, if a user selectively designates a file type through the menu screen (block S402), a woofer enable/disable flag can be set for the file type. For example, as shown in FIG. 3A, if the user selectively designates the file types such as JPG, BMP, PDF, a flag to forcibly disable the woofer AMP 240 can be set as 'Woofer_Disable=1'. (block S403)

Then, information of a woofer enable/disable file type list as set in connection with the flag can be managed, for example, recorded such as in a memory. The memory can be nonvolatile memory such as EEPROM 22 shown in FIG. 1B.

In the application program 210, if a file as selected by the user through an interface with an OS 200 (block S404), the file type to be executed and the information of the woofer disable file type list can be compared to each other and identified. (block S405). As a result of identification, if the file type to be executed is the file type set as disable (block S406), for example, if the file type is the PDF file preset as woofer disable by the user, the woofer AMP 240 can be forcibly disabled.

The woofer AMP 240 can be disabled using an interface with the micom 220*a* included in the south bridge 240. Thus, an unnecessary vibration sound of a low-pass component of the audio signal to the woofer speaker 250 can be reduced.

However, if the file type to be executed is the file type set as woofer enable, for example, in case of the MP3 file, the woofer AMP 240 can be normally operated. The woofer AMP 240 can be operated using the interface with the micom 220*a* included in the south bridge 220 to output the vibration sound of the low-pass component through the woofer speaker 250. (block S408)

Accordingly, by performing a corresponding enable/disable operation of the woofer based on the file type, the unnecessary operation of the woofer can be stopped, to correctly select and listen to the audio of high-pass component only. (block S409) Alternatively, a user can individually select a current file for woofer disable independent of or in addition to a corresponding file type.

In the embodiment of FIG. 4, it is possible to prevent a battery power source from being consumed to efficiently extend a time for using a battery having limited capacity. The battery power source can be conserved by forcibly turning off the woofer AMP, preferably having no relation with the present executed file type, in case a current power source mode is a battery mode.

Figure 5:
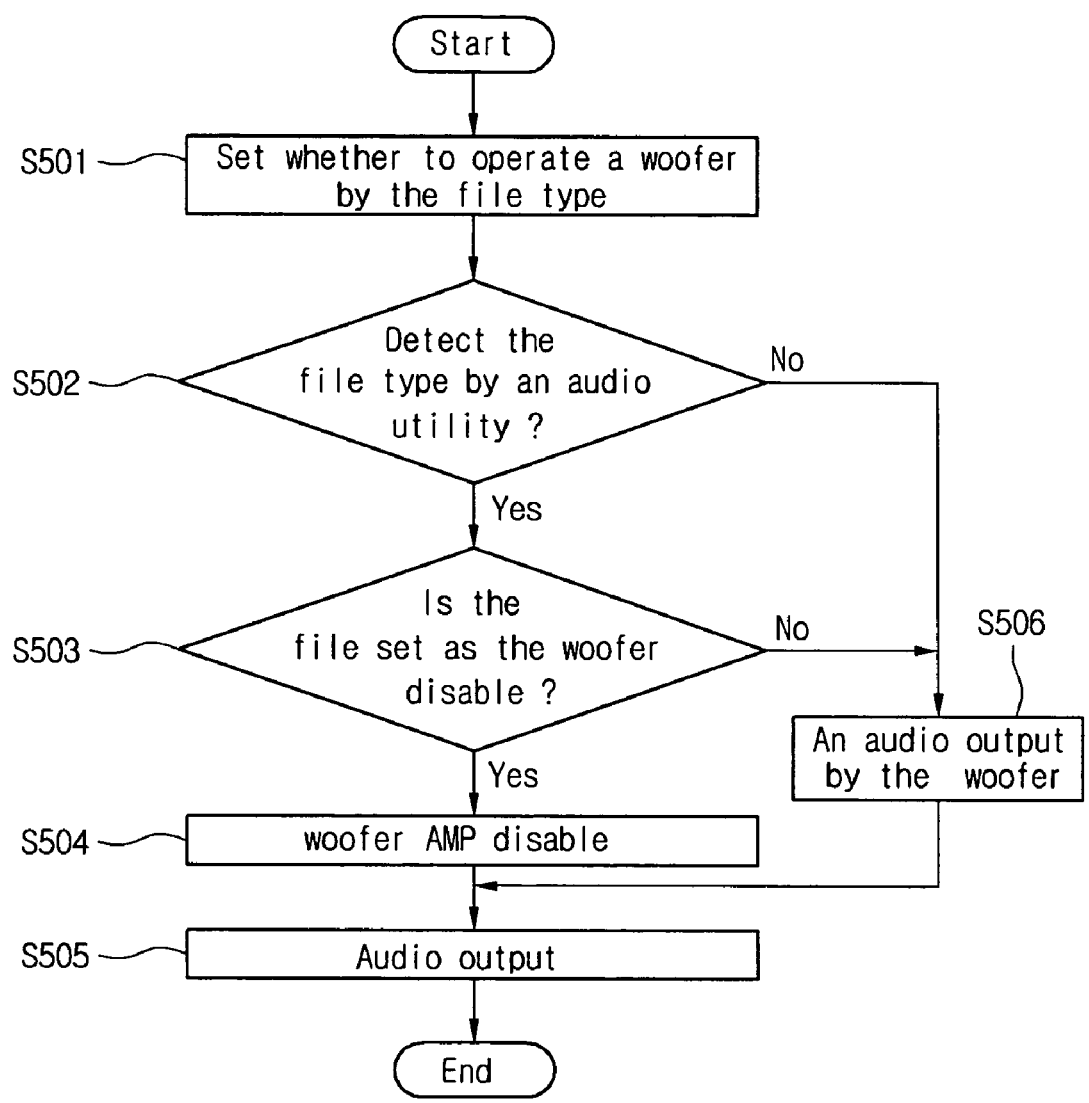
FIG. 5 is a flow chart illustrating an embodiment of a method of woofer operations by a file type.

FIG. 5 is a flow chart illustrating an embodiment of a method for operating a woofer by a file type according to the invention. As shown in FIG. 5, it can be determined for a system whether to operate a woofer by the file type and the determination can be stored (block S501).

If a file is executed in a system, whether to detect the file type on the basis of an audio utility can be identified (block S502). Further, whether the file as detected is set as woofer disable can be identified. (block S503)

If the file is set as the woofer disable, an audio is output after the woofer is disabled (block S504). Concurrently, the audio is output using the high pass speaker. (block S505)

If the file type to be executed is not detected (block S502), or if the file type is a woofer enable as a result of the detection (block S503), an audio is output by the woofer operation (block S506). Concurrently, the audio is output using the high frequency speaker (block S505).

Figure 6:
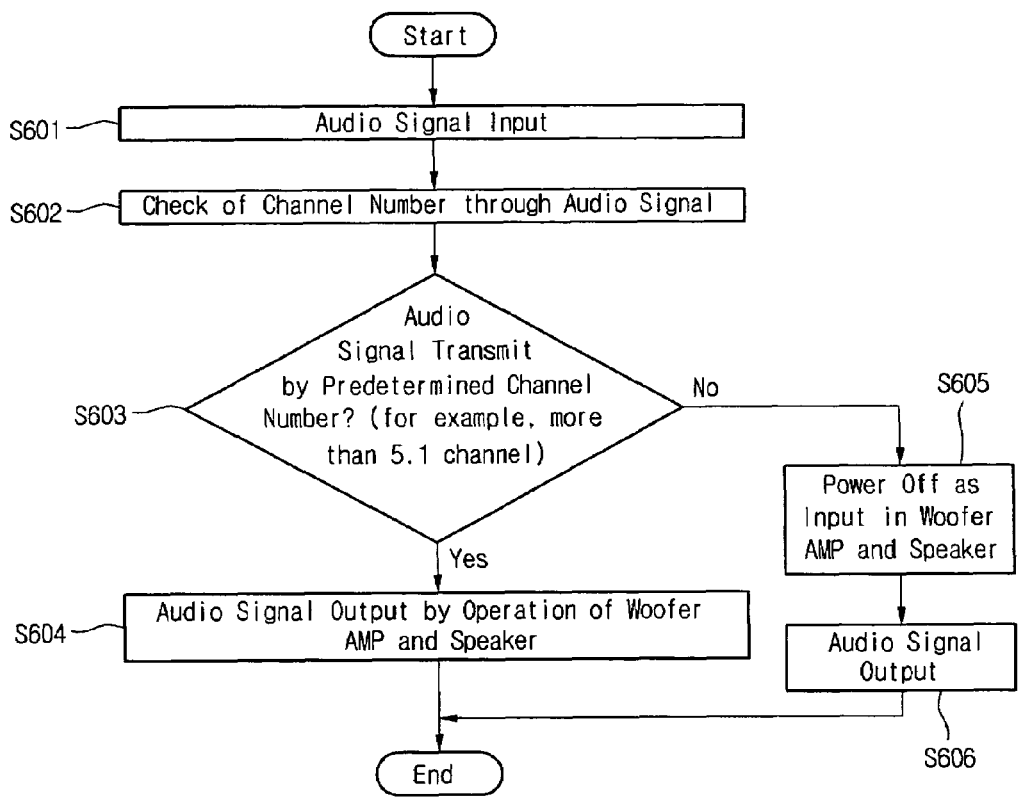
FIG. 6 is a flow chart illustrating an embodiment of a method of woofer operations by a channel number of an audio signal to be output.

FIG. 6 is a flow chart illustrating an embodiment of a method of woofer operation by a channel number of an audio signal to be output. As shown in FIG. 6, when an audio signal is output through a CODEC 230, a channel detector 300 can detect a channel number of the audio signal (blocks S601, S602).

Comparing the detected channel number and a predetermined value such as the table as in FIG. 3D, whether the detected channel number corresponds to the woofer operation can be identified (block S603). As a result of the above identification, if the channel number is more than a predetermined channel number for the woofer operation, for example, if the channel number is more than 5.1, the audio signal can be output through the woofer AMP and woofer speaker (block S604).

Otherwise, if the channel number is less than the predetermined channel number for the woofer operation, for example, if the channel number is 2 or 3, the audio is output to a general speaker by turning off the power source for the woofer operation (blocks S605, S606). Thus, a low pitch audio output device can be controlled according to a detected channel number of an audio signal.

Figure 7:
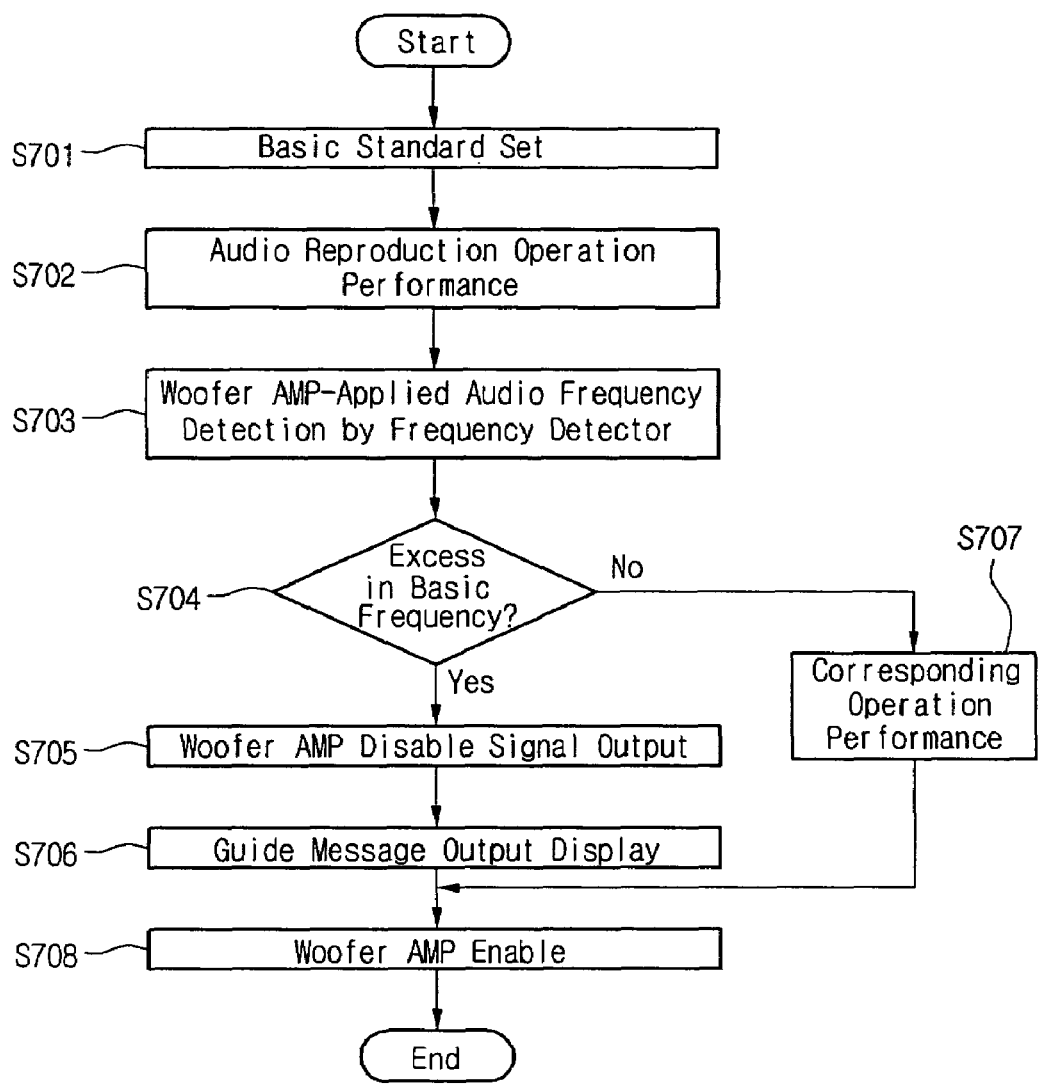
FIG. 7 is a flow chart illustrating an embodiment of a method of woofer operations based on by frequency of an audio signal to be output.

FIG. 7 is a flow chart illustrating an embodiment of a method of woofer operation by frequency of an audio signal to be output. As shown in FIG. 7, basic frequency for a woofer operation enable/disable can be determined or preset as shown in FIG. 3B or FIG. 3C (block S701).

Then, if a user requests an audio reproduction operation, an application program 210 can reproduce a file selected by the user. The CODEC 230 can perform a chain of an audio reproduction operation by decoding audio data of the reproduced file for a signal processing and output an audio signal of a first component (e.g., high-pass component) as a tune sound through an audio AMP 260 and an audio speaker 270 and outputting an audio signal of a second component (e.g., low-pass component) as a vibration sound through a woofer AMP 240 and a woofer speaker 250 (block S702).

A frequency detector 300 can detect the frequency of an audio signal applied to the woofer AMP 240 and outputs the detected frequency to a micom 220a included in a south bridge. The micom 220a can compare and determine whether the detected audio frequency is in excess of predetermined basic frequency (block S704).

For example, if the detected frequency is in excess of the highest basic frequency of the low-pass component for the audio signal receivable in the woofer AMP, the woofer AMP can be disabled. For example, the micom 220a can output a disable control signal to a 'Shutdown Pin' terminal provided in the woofer AMP 240 (block S705).

Further, a user alert such as a guide message can be displayed on screen. Thus, the user can know the situation that the woofer AMP is forcibly stopped by the disable control signal (block S706).

However, if the detected audio frequency is not in excess of the basic frequency receivable in the woofer AMP, an enable control signal can be output to the woofer AMP (e.g., 'Shutdown_Pin' terminal provided in the woofer AMP 240) so that the woofer operation is continuously maintained (block S707). As described above, the woofer can be set as enable/disable based on the frequency, and the audio is output accordingly (block S708).

In embodiments according to the invention, to extend a time for using a battery having limited capacity when the current power source mode is a battery mode, the woofer AMP can be disabled independent of the audio frequency applied to the woofer AMP. Thus, a low pitch audio output device can be controlled according to a power source.

FIG. 8 is a flow chart illustrating an embodiment of a method for controlling operations of a low pitch audio output device (e.g., woofer) according to the invention. As shown in FIG. 8, audio information for controlling a woofer operation (e.g., file type, frequency and channel number) or a power source for use can be selected. Further, a basic value of each constitutional audio information can be set (blocks S801, S802).

The audio information as executed can be analyzed. Further, the power source for use can be identified among at least one or more power sources (block S803).

The woofer operation can be selectively controlled in accordance with the identified information to output an audio (blocks S804, S805, S806). Therefore, according to embodiments of the invention, it is possible to control or forcibly stop output operations (e.g., a woofer operation) of a low-pass audio component based on information such as a specific type of a music file to be reproduced, frequency, a channel number, a power source or the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of the present invention have various advantages. Embodiments relate to apparatus and methods for controlling an operation of an audio device (e.g., woofer) among a plurality of audio devices for outputting a prescribed (e.g., low) sound in a computer by at least one or more information of audio data type, audio signal, audio channel number, used power source and the like. According to embodiments of the present invention, it is possible to set a selected file to be executed in an audio output system as a woofer disable. Further, according embodiments, it is possible to forcibly stop the woofer operation to the audio of a low-pass component by the information of the specific type of a music file to be reproduced, frequency and a channel number. In addition, according to embodiments the present invention, it is possible to correctly select and listen to the audio of a high-pass component only, by stopping a unnecessary operation of the woofer, when executing a specific type of file such as a file for language study. Further, according to the present invention, it is possible to efficiently extend a time for using a battery having limited capacity by forcibly stopping a woofer operation for the audio of a low-pass component, when the power source for use is a battery.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for controlling an operation of a portable computer, comprising:
    an operation device for executing a system operation and data;
    a CODEC configured to perform encoding or decoding of audio data;
    a woofer device configured to output a low audio sound;
    a control circuit coupled to the CODEC and the woofer device configured to selectively disable operation of the woofer device, the control circuit to disable operation of the woofer device under a first condition that is based on a text file type to be executed, and to disable operation of the woofer device under a second condition that corresponds to when a current power source is a battery, the control circuit to disable operation of the woofer device when the current power source is a battery irrespective of a text file type to be executed.

2. The apparatus of claim 1, further comprising a memory in which an audio basic value and information corresponding to a plurality of file types are stored to be used for controlling the woofer device, wherein the control circuit disables operation of the woofer device under a third condition, the third condition based on file types that do not correspond to audio files.

3. The apparatus of claim 1, wherein the operation device includes one or more of an operating system or an application program.

4. The apparatus of claim 3, wherein the woofer device is a woofer AMP and a woofer speaker for outputting an audio signal of a low-pass component of the audio data as decoded.

5. The apparatus of claim 1, wherein the control circuit disables the woofer device under a third condition based on an audio frequency signal.

6. The apparatus of claim 1, wherein an audio signal of a high-pass component and an audio signal of a low-pass component in connection with the low audio sound are separately output from the CODEC to an audio output device including the woofer device.

7. The apparatus of claim 1, wherein the control circuit is to disable operation of the woofer device under a third condition that is based on a channel number of an audio file to be output.

8. The apparatus of claim 7, wherein the channel number is one that does not require sound to be output through the woofer device.

9. The apparatus of claim 1, wherein the control circuit is to disable operation of the woofer device under a third condition that is based on a frequency of an audio file to be output.

10. A method for operating an audio device in or coupled to a portable system, comprising:
    identifying a file type being currently executed in the system;
    selectively disabling a lower sound audio output device of a plurality of audio output devices in or coupled to the system under a first condition that is based on identification of the file type as a text file type; and
    disabling the lower sound audio output device under a second condition that corresponds to when a current power source is a battery, the lower sound audio output device disabled when the current power source is a battery irrespective of a text file type to be executed in the system.

11. The method of claim 10, wherein the lower sound audio output device is a woofer, and wherein a woofer amplifier is disabled when either the first condition or the second condition is satisfied.

12. The method of claim 10, wherein an audio signal of a high-pass component and an audio signal of a low-pass component in connection with a lower sound audio output are separately output from a CODEC to the audio output devices.

13. The method of claim 10, wherein operation of the lower sound audio output device is disabled based on a channel number of an audio file to be output.

14. The method of claim 10, wherein operation of the lower sound audio output device is disabled based on a frequency of an audio file to be output.

15. A method for operating an audio device in or coupled to a portable system, comprising:
    setting an enable/disable status of a low sound audio output device based on text file type, wherein information corresponding to the enable/disable status is set in a table stored in advance in a memory of the portable system;
    identifying a file type of a file to be currently executed;
    determining an enable/disable status of the identified file based on said information in the table; and
    disabling an operation of the low sound audio output device when the identified file type corresponds to the text file type and said information in the table corresponding to the text file type indicates that the enable/disable status is disable, wherein:
    the low sound audio output device is one of a plurality of audio output devices having different characteristics, and an audio signal of a high-pass component and an audio signal of a low-pass component in connection with a low sound audio output are separately output from a CODEC to the audio output devices, and
    disabling operation of the low sound audio output device when a current power source of the system is a battery, operation of the lower sound audio output device disabled when the current power source is a battery irrespective of a text file type to be executed by the system.

16. The method of claim 15, wherein the low sound audio output device is a woofer.

17. The method of claim 15, wherein operation of the low sound audio output device is disabled based on a channel number of an audio file to be output.

18. The method of claim 15, wherein operation of the low sound audio output device is disabled based on a frequency of an audio file to be output.

19. A method for operating an audio device in or coupled to a portable system, comprising:
    determining an enable/disable audio command responsive to at least one of a plurality of audio information of audio to be output, wherein the enable/disable command is set in a table stored in advance in a memory of the portable system;
    identifying said at least one of audio information of a file being currently executed;
    determining the enable/disable audio command corresponding to the identified file; and
    disabling an operation of the low sound audio output device when the determined enable/disable command is disable, wherein the low sound audio output device is one of a plurality of audio output devices having different characteristics in an audio device and wherein the identified file is a text file, said method further comprising:
    disabling operation of the low sound audio output device when a current power source of the system is a battery, operation of the lower sound audio output device disabled when the current power source is a battery irrespective of a text file type to be executed by the system.

20. The method of claim 19, wherein an audio signal of a high-pass component and an audio signal of a low-pass component in connection with a low sound audio output are separately output from a CODEC to the audio output devices including the low sound audio output device.

21. The method of claim 19, wherein operation of the low sound audio output device is disabled based on a channel number of an audio file to be output.

22. The method of claim 19, wherein operation of the low sound audio output device is disabled based on a frequency of an audio file to be output.

\* \* \* \* \*